United States Patent

Kreuter

[15] 3,638,553

[45] Feb. 1, 1972

[54] METHOD OF TREATMENT OF COCOA BUTTER-CONTAINING MOLTEN CHOCOLATE MASS

[72] Inventor: Walter Kreuter, Essener Str. 104, Hamburg 62, Germany

[22] Filed: Sept. 4, 1969

[21] Appl. No.: 855,318

[52] U.S. Cl. ................................................99/23
[51] Int. Cl. ...............................................A23g 100
[58] Field of Search ........................99/23–26, 326

[56] References Cited

OTHER PUBLICATIONS

Williams, C. Trevor Chocolate and Confectionery Leonard Hill Books, Limited, London (1956) pp. 132– 134

*Primary Examiner*—A. Louis Monacell
*Assistant Examiner*—William A. Simons
*Attorney*—Beaman & Beaman

[57] ABSTRACT

A method of treatment of substances containing cocoa butter, particularly chocolates, which is suitable for coating machines, wherein the material containing cocoa butter is first heated slightly above the highest melting point of cocoa butter, then subjected to a two stage cooling step whereby the material in first cooled to a range approximately 30° to 31° C. by a cooling medium having a temperature only slightly lower than this range and secondly cooling the mass to 28° to 29° C. by a cooling medium having a temperature only slightly lower than this range, and then heating the material to 33° to 34° C. and subjecting to further processing (i.e. coating). The material after this treatment is in a thermostable condition, has a substantially constant viscosity and may be stored indefinitely under stirring and when maintaining the temperature of the temperature of the material.

11 Claims, 2 Drawing Figures

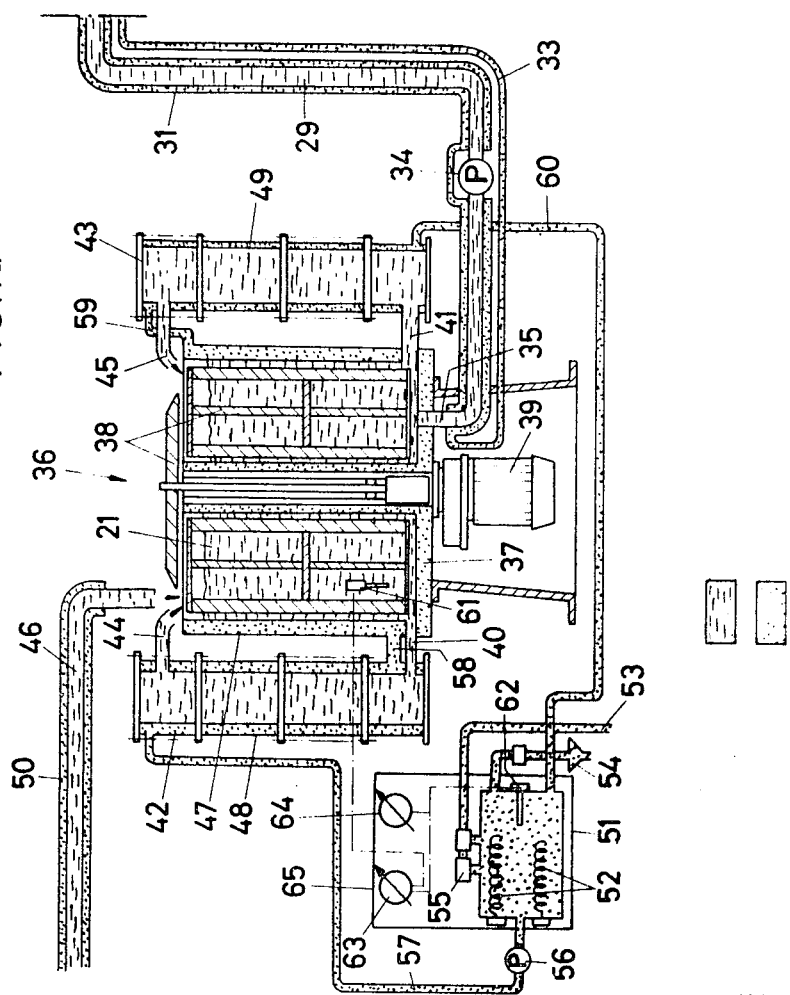

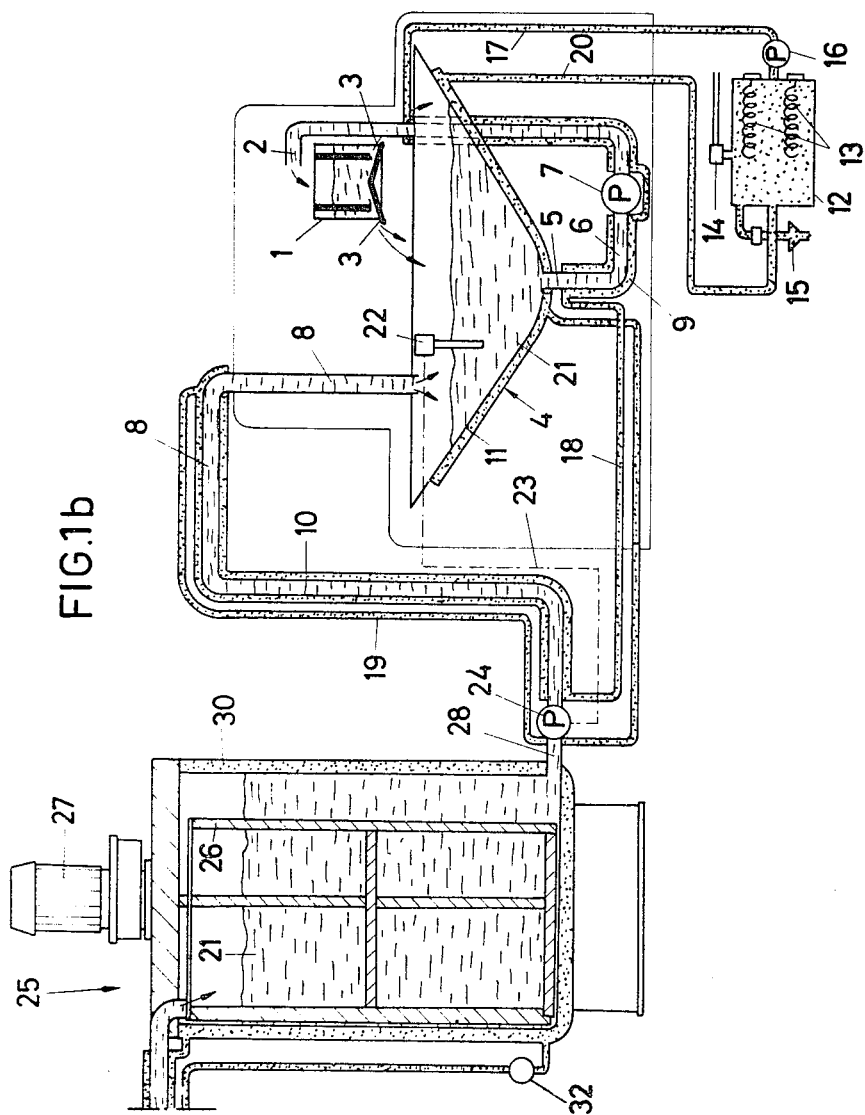

METHOD OF TREATMENT OF COCOA BUTTER-CONTAINING MOLTEN CHOCOLATE MASS

In the manufacture of chocolate bars and chocolate coated articles, such as cream chocolates, a correct treatment of the chocolate substances supplied in fluid condition is of decisive importance for the appearance and the keeping qualities of the product. The treatment comprises cooling and heating procedures which constitute essential steps of the method of treatment and are, as a whole, also called tempering or preliminary crystallization. During this treatment, cocoa butter crystals are developed in the substance and since the cocoa butter is polymorphous, it is assumed that the empirical dependence of the resulting processing quality on the type of treatment may be attributed to the formation of crystal nuclei of different modifications in accordance to the different temperatures to which the substance is subjected during the treatment. However, only nuclei of the most stable modification having the highest melting point are desired in the substance ready for processing. If the treatment is unsuitable, the finished chocolate which has been processed and solidified has only a dull gloss and an inhomogeneous structure which is characterized by grey tones or brighter spots. Sooner or later, particularly with high storage temperatures, the so-called fat "bloom" will develop which severely impairs the appearance of the manufactured goods. With correct treatment of the substance, however, chocolate products are obtained which have smooth, uniform and relatively dark colored surfaces having an intensive gloss. These products have a relatively high temperature stability and storage quality and show little tendency to form fat bloom.

In prior art treatment methods, the substance which has been heated beyond its highest melting temperature is cooled down under stirring, mixing and scraping to the processing temperature of about 31° to 30° C. During this cooling procedure, the substance is brought into heat exchange relationship with a cooling medium which has a relatively low temperature such as water of about 15° C. The result of the stirring and scraping at the cold walls of the heat exchanger through which the cooling medium is circulating is that the substance which has been cooled down in the vicinity of the heat exchanger to a comparatively low temperature is again mixed with the rest of the substance which is still at a higher temperature and thus the cooled substance is again heated up to the desired temperature.

The viscosity of a substance which has been treated according to the described conventional method remains, but varies even when keeping the temperature constant; in fact, the viscosity of the substance increases relatively quickly so that the treated substance is usable for a limited period of time only. This represents a considerable disadvantage particularly in the production of chocolate coated articles, since the coating of articles is normally carried out by pouring the chocolate substance inside a coating box over the articles to be coated and decanting the excess chocolate again from the coating box. Since the viscosity of the chocolate substance which has been tempered in the conventional manner does not remain constant, the excess quantity discharged from the coating box may be reused only during a limited period of time, without having recourse to retempering. The viscosity of the substance increases steadily until finally the produced coatings will become too thick and uneven so that the substance must be retempered, i.e., heated above its highest melting point and then treated in the above-described manner, before it can be reused. In the practical operation, it is attempted to delay this gradual thickening of the tempered chocolate by certain methods, for example by adding untempered chocolate substance to the already thicker substance. Through this type of remedial measure the increase of the viscosity up to a value unusable for processing can, however, only be delayed insignificantly, and furthermore, the success of this type of measure depends to a very large degree upon the skill and the experience of the operators. Even when having recourse to this type of measure, the major proportion of the excess substance discharged from a coating machine must eventually be tempered anew, since, with conventional coating machines a relatively small fraction of the total chocolate quantity supplied to the coating box is used up and the larger portion represents a leftover excess quantity, the viscosity of which does not remain constant. This prior method is very uneconomical since the necessary reheating of a larger portion of the chocolate substance results in a high energy consumption and furthermore correspondingly large apparatus for the reheating and cooling (tempering or preliminary crystallization) is required.

The prior art treatment or tempering plants may be designed separately in the form of a tempering machine or may be incorporated directly into a coating machine. A coating machine having built-in tempering means generally is operated according to the method of cyclic tempering or according to the method of multicircuit tempering. In the method of cyclic tempering, the chocolate substance is continuously retempered and remelted, in order to prevent the substance from reaching the condition of so-called "overtempering" which is characterized by the above-described steep increase of the viscosity of the substance. The viscosity increase is accompanied by self-heating of the chocolate substance, as a result of the heat of crystallization released. The method of cyclic tempering thus leads to a chocolate substance in which there is no thermostatic equilibrium between solid and fluid phases. An overtempered chocolate substance is unsuitable for processing since the formation of fat bloom is instantly initiated. Especially the large-sized cocoa-butter crystals are responsible for this formation of bloom. Fissures appear between the large and the small crystals as a result of the volume contraction. Light is scattered by these fissures and small white fat bloom stars are observed on the surface of the chocolate. In order to avoid these defects, the substance must be continuously retempered. For example, for a coating unit having an article conveyor belt of 800 mm. width 2,000 kg. of chocolate substance per hour must be tempered and melted, although the actual consumption normally amounts to only between 200 to 250 kg. per hour. From these figures it is seen that the method of cyclic tempering is highly uneconomical.

With the method of multicircuit-tempering, in particular with the method of two-circuit-tempering, a molten chocolate substance is cooled by scraping in the first section of a tempering apparatus, and in the second section of the apparatus it is mixed with a tempered chocolate substance and somewhat heated up. After leaving the tempering apparatus, the chocolate substance is ready for processing. The mixing of the cooled chocolate with the tempered warm chocolate substance may be regarded as an inoculation of the cooled substance with more stable cocoa butter crystallization nuclei. As a result of the relatively high viscosity and the poor miscibility of the chocolate substance, this inoculation is not homogeneous so that local differences occur with regard to the number of more stable cocoa butter crystallization nuclei per unit volume. Furthermore, inhomogeneities in the temperature distribution can hardly be completely avoided when mixing two chocolate substances having different temperatures. It follows therefore that a substance which has been treated in this way does not release its heat content evenly, and in particular its heat of crystallization, after processing when cooling the substance in a cooling duct. This can lead to partial melting of the stable cocoa butter crystals, thereby forming small pockets of fluid instable cocoa butter. These pockets later efflorescence in forming fat bloom. In the two-circuit method, the chocolate substance must likewise always be reheated beyond its highest melting point (and thereby melted) and be retempered so that the substance does not reach the stage of overtempering. This means that here too, no thermostatic equilibrium exists between the formed more stable cocoa butter crystallization nuclei and the instable cocoa butter molecules in the fluid phase. The overtempering is therefore not prevented even with a two-circuit tempering method.

Although the two-circuit method is somewhat more economical because only half the substance must be retempered, the two described prior art tempering methods are essentially similar to each other with respect to processing technique and are subjected to the same disadvantages.

In order to avoid the above-mentioned disadvantages, it has already been proposed to preliminarily crystallize a molten chocolate substance by twice cooling and reheating. In this way, the substance is at first gently cooled down to a temperature of about 29° C. and then kept at this temperature until the viscosity reaches a maximum. Then the substance is heated up to about 33° C. and kept at this temperature until the viscosity remains constant. Then the substance is again gently cooled down without undercooling, to 29° C. and then kept at this temperature until the viscosity has again reached a maximum. Finally the substance is again heated to 33° C. A substance treated in this manner should have a constant viscosity over longer periods (it would naturally be a prerequisite in any case that the temperature of the treated substance which is continuously stirred be kept constant).

The last-described so-called cyclothermal preliminary crystallization has not yet been practically employed in a tempering machine. The reheating and recooling is rather cumbersome and requires a fairly complicated apparatus which must be operated with care, and which has with regard to energy consumption the additional disadvantage that heating is necessary twice. If the method is to be employed for continuous operation, at least four heat exchangers are required.

It is an object of the present invention to provide a method of treatment of substances containing cocoa butter, in particular chocolates by which a processable substance may be obtained in a simple manner wherein the substance does not need to be heated twice and the substance thus treated has a substantially constant viscosity over relatively long periods and has all the properties of a well-tempered substance.

It is a further object of the present invention to provide an apparatus for carrying out the above-described method.

For achieving the objects stated above, there is proposed, according to the present invention, a method of treatment of substances prepared for processing and containing cocoa butter, particularly chocolates, according to which a substance which has been heated to a first temperature above the highest melting point of the substance is cooled down to a predetermined second temperature, preferably within a range from about 28° to about 29° C., then the substance is again heated up without overheating to a predetermined third temperature, preferably within a range from about 33° to about 34° C. whereby the third temperature is lower than the first temperature and the method of the invention is characterized in that the cooling from the first temperature to the second temperature is effected in two stages whereby an intermediate temperature at the end of the first stage is preferably within a range from about 30° to 31° C. and whereby in both stages the substance is cooled by a cooling medium, the temperature of which in each of these two stages is only slightly lower than the final temperature of the substance in each of these respective stages.

It has been shown that a substance treated according to the method of the invention has a viscosity which remains constant over long periods of time at the third or the final temperature, and that such a substance, after processing, results in products which have all desired properties of a high quality chocolate surface. The method of the invention is more simple and more economical than the known methods in which cooling and reheating is effected twice, since the method of the invention may be carried out at the expense of less time and energy; these simplifications lead to a considerable saving of costs particularly if automatic control devices are employed. Since the method of the invention is basically similar to conventional simple methods of treatment or tempering having only a single cooling step and a single heating step, the method of the invention may be carried out in many cases by employing existing conventional treatment apparatus.

It may be practical to keep the substance for a predetermined time, for example for 5 minutes, at the intermediate temperature. According to a further refinement of the invention the treated substance may be poured into a storage reservoir and kept therein at the third temperature, i.e., stored ready for processing. This allows batch operation which is advantageous for several reasons. For example, it is possible to treat several small quantities of substance subsequently and to fill these quantities into the storage reservoir when using a relatively small treatment and tempering apparatus in the form of a conventional dish tempering machine. The substance which is ready for processing may then be taken out of the storage container in desired quantities which may also vary. It is of course likewise possible to feed several storage containers from a single tempering machine. The method of the invention is particularly advantageous in those cases in which the substance is processed in excess after a single cooling and reheating at about the third temperature. The excess substance resulting during processing may then be kept at the third temperature and reused without cooling the substance down to the first temperature. In this case the viscosity of the substance does not increase with time to such a value necessitating renewed treatment (tempering) of the whole substance after heating up the substance beyond its highest melting point. The consumption, i.e., the quantity of substance used up during processing may be compensated for by the addition of supplementary quantities of treated substance which are at the third temperature. If a storage reservoir of the above-described type is employed, the supplementary quantity may be taken from this storage reservoir so that this storage reservoir serves as a buffer between the processing apparatus and the treatment or tempering apparatus. In this way it is possible to shield the treatment apparatus from strong fluctuations in the feed of the supplementary quantity such as may be encountered with the supplementary quantity supplied. It goes without saying that the supplementary quantity may also be taken directly from the treatment apparatus; in this case the treatment apparatus or the processing apparatus figures as the storage reservoir. It is likewise possible to employ a continuously cycling treatment apparatus which feeds to a storage reservoir or is adapted to supply the supplementary quantity directly. In each of these cases the advantage is that renewed treatment of the excess substance resulting from processing is unnecessary.

The above-described method of operation in which the substance is treated in excess is particularly suitable for coating machines. For carrying out this method there is proposed, according to the present invention, an apparatus comprising a circuit including a processing unit having an inlet for the supply of substance and an outlet for the discharge of excess substance, a circulation container disposed in line with at least one conveyor apparatus between the inlet and the outlet of the processing unit whereby the apparatus additionally comprises a supplementary supply line connected to this circuit and adapted to discharge a substance into this circuit, and a tempering apparatus for the treatment of the substance through the cooling and heating procedure wherein this apparatus is characterized in that the tempering apparatus is disposed completely externally to the circuit and is connected to this circuit only through the supplementary supply line. As has been mentioned above already, it is practical to provide a storage reservoir comprising means for maintaining the temperature between the tempering apparatus and the supplementary supply line. A fluid flow control means such as a valve or a pump which is controlled by the level in the circulation container may be provided in a manner known per se for the control of the supplementary quantity delivered. The tempering means needs only to be dimensioned according to the consumption of substance in the processing unit. Normally, the tempering apparatus will have a certain excess capacity but this does not alter the fact that the teaching of the present invention allows to use considerably smaller tempering apparatus for coating machines, in comparison to conventional treatment or tempering methods.

In the following, the invention will be described by means of various examples and in connection with the attached drawing.

As the following first example shows, the method of the invention may be practiced also in using conventional tempering apparatus. In a conventional dish tempering machine of the type Kreuter TM 100 having a water-heated jacket, 25 kg. of chocolate supplied at an initial temperature of 40° C. (first temperature) were at first cooled down during 30 minutes at a cooling water temperature of 30° C. to an intermediate temperature of 29.9° C. This intermediate temperature was maintained for 10 minutes. Then the cooling water temperature was reduced to 26° C., and after a further 30 minutes the temperature of the substance was 27.8 C. (second temperature). Then the water temperature was increased to 33.5° C., and after further 30 minutes the temperature of the substance likewise was about 33.5° C. This temperature was maintained constant by automatic control and it was observed that the viscosity of the substance remained unchanged even after a long time. The test was abandoned after 60 hours.

It is also feasible to further subdivide these two cooling steps, although the two-stage cooling will be preferred because it represents the simplest processing technique. Merely in order to demonstrate that a multistage cooling is feasible the following test was carried out: 25 kg. of chocolate substance having an initial temperature of 37° C. were filled into the already mentioned dish tempering machine of the type Kreuter TM 100 and cooled initially for 45 minutes at a water temperature of 30° C. The resulting intermediate temperature of the substance was then likewise 30° C. Then the cooling water temperature was reduced to 28° C., and after 10 minutes the temperature of the substance was 29° C. Then the cooling water temperature was further reduced to 26° C. After the substance had again reached (as in the previous example) a temperature of 27.8° C., the water temperature was increased to 33.5° C., and after 30 minutes the temperature of the substance was again about 33° to 33.5° C. The substance treated in this manner likewise did not show any noticeable decrease of its viscosity after 60 hours.

The accompanying FIGS. 1a and 1b drawings schematically illustrate an apparatus for the coating of articles with chocolate, in which the method of the invention is applied.

The apparatus illustrated in the Figures comprises a processing unit 1 in the form of a conventional coating box for the coating of articles with chocolate. The coating box includes an inlet 2 for the feeding of substance and an outlet 3 for the discharge of excess substance. The excess substance is discharged from the outlet 3 into a circulation container 4 having a drain 5 connected via a pipe 6 to a conveyor device such as a pump 7 which conveys the substance to the inlet 2 of the coating box 1. The circuit consisting of coating box 1, circulation container 4 and conveyor device 7 is connected to a supplementary supply line 8 which in the illustrated apparatus opens into the circulation container 4 and is adapted to supply a supplementary quantity of treated substance which compensates the consumption in the coating box 1. The above described parts may be heated in order to keep the substance circulating in the processing circuit at a predetermined temperature. As shown in FIG. 16, the connection pipe 6, the supplementary supply line 8 and the circulation container 4 are provided with heating jackets 9, 10, 11, respectively, which are supplied with a heating medium, normally water, by a thermostat controlled heating device 12. As seen in FIG. 1b, the heating device 12 and its components are only schematically illustrated; the reference numeral 13 designates electric heater coils and the reference numerals 14 and 15 designate valves for cold water inflow and cold water discharge. The heating medium which has been heated by the heating device 12 to a predetermined temperature in the conventional manner is circulated by means of a pump 16 through a feed line 17, the heating jacket 9 of the connecting pipe 6, through a further connecting pipe 18, the heating jacket 10 of the supplementary supply line 8, through a further connecting pipe 19, the heating jacket 11 of the circulation container 4 and through a return line 20. The control devices for the thermostatic control of the heating medium are not shown.

A substance 21 contained in the circulation container 4 is maintained at a predetermined temperature by the heating jacket 11; the temperature of the heating medium circulating in the heating jacket 11 may of course also be controlled by a temperature sensor (not shown) which responds to the temperature of the substance 21. The substance 21 is filled into the circulation container 4 in treated (tempered) condition, and the heating of the circulation container is controlled in such a manner that the substance contained therein is maintained substantially at the final temperature of the treatment or tempering process. Since the viscosity of the substance treated according to the method of the present invention does not change even over prolonged periods when maintaining the substance at its final temperature, the substance in the circulation container 4 which is circulated through the coating box 1 remains in the treated (tempered) condition and may be continuously reused without any danger of a thickening of the substance.

A level sensor 22 is provided inside the circulation container 4 and is adapted to control the discharge of treated substance from the supplementary supply line 8 into the circulation container 4 in a conventional manner. FIG. 1b illustrates schematically a pilot line 23 leading to a pump 24 which is arranged at the inlet of the supplementary supply line 8. If the level of the substance in the circulation container 4 drops below a predetermined height the pump 24 is put into operation and supplies freshly treated substance into the circulation container until a predetermined level of the substance has been reached at which the pump 24 will be switched off by a signal from the level sensor 22.

In the apparatus shown in the FIGS. the supplementary supply line 8 is fed from a storage reservoir 25 in which treated substance 21 is kept under continuous stirring at a constant temperature. As schematically illustrated in the Figure, the storage reservoir 25 comprises an agitator 26 connected to a drive motor 27. The outlet 28 of the storage reservoir 25 is connected to the inlet of the pump 24. The storage reservoir 25 may be filled with treated substance from an inlet line 29.

The storage reservoir 25 and its components may likewise be heated. The FIGS. illustrate a heating jacket 30 for the storage reservoir 25 and a heating jacket 31 for the inlet line 29. A controlled heating and conveying device 32 circulates a heating medium which preferably consists of water through the heating jackets 30 and 31 and a return line 33. The temperature of this heating cycle may be controlled by any means known to the one skilled in the art, for example by means of a temperature sensor (not shown) responsive to the temperature of the heating medium and/or the temperature of the substance in the reservoir 25.

IN the apparatus illustrated, the feeding of the treated substance into the storage reservoir is effected by means of a pump 34 connnected to an outlet 35 of a tempering apparatus 36 according to the invention which serves to treat a substance by cooling and heating.

The tempering apparatus shown in FIG. 1a is adapted to batch production in a manner similar to a conventional dish tempering machine. The tempering apparatus comprises a vessel 37 with a built-in agitator 38 powered by an electric motor 39. Outlet pipes are connected to the lower end of the vessel 37; two outlet pipes 40 and 41 are indicated in the FIG. 1a. These outlet pipes lead to heat exchangers 42 and 43, respectively, which may be conventional heat exchangers such as narrow-gap heat exchangers.

From the opposite ends of the heat exchangers 42, 43 the substance recirculates into the vessel 37 of the tempering apparatus. In order to pass the substance through the heat exchangers, these heat exchangers are provided with conveying devices (not shown) or the heat exchangers themselves are arranged in the manner of a conveying device. For example, the heat exchangers may be provided with screw conveyors in a known manner. Conveying means and drive means therefore which are known per se are not shown in the drawing. A supply line 46 for untreated (untempered) substance opens into the vessel 37.

The substance contained in the heat exchangers 42, 43 and in the vessel 37 may be cooled or heated in the manner desired by the method of the invention by means of a tempering medium which preferably consists of water and is adapted to be controllably heated or cooled. For this purpose, the vessel 37 is provided with a heating jacket 47 through which the tempering medium circulates. The tempering medium also circulates through the heat exchangers 42 and 43; as shown in the Figure these heat exchangers are provided with heating jackets 48, 49 respectively. The tempering medium may also be circulated in a manner different from the one shown. Preferably the supply line 46 for untempered substance is provided with a heating jacket 50 through which hot water supplied from a source of hot water (not represented) circulates. The tempering medium, preferably water, is cooled and heated in the desired manner in a combined heating and cooling device 51. The combined heating and cooling device 51 is only illustrated schematically in FIG. 1a in which heater coils 52, a cooling water supply line 53, a cooling water discharge line 54 and control valves 55 in the cooling water supply line are shown.

The tempering medium which is preferably water is supplied from the combined heating and cooling device 51 by means of a pump 56 through a pipe 57 into the tempering machine proper; in the apparatus illustrated the components of the tempering apparatus 36 through which the tempering medium circulates are connected in series, the tempering medium arriving in pipe 57 passes through the heating jacket 48 of the first heat exchanger 42, then through a connecting pipe 58, the heating jacket 47 of the vessel 37, a second connecting pipe 59, the heating jacket 49 of the heat exchanger 43 and through a return line 60.

The heating and cooling in the combined heating and cooling device 51 is controlled by a program control unit in response to the temperatures of the substance and the tempering medium. The temperature of the substance contained in the tempering apparatus 36 is indicated by a temperature sensor 61, and the temperature of the tempering medium is measured by a temperature sensor 62 in the combined heating and cooling device 51. The two temperature sensors 61 and 62 may be connected as shown in the FIG. 1a to indicating controllers 63 and, respectively. The program control device is indicated schematically at 65.

The apparatus shown in FIG. 1a is adapted to batch production. The vessel 37 of the tempering apparatus 36 may be provided with a level sensor (not shown) which initiates tempering as soon as the vessel 37 has been filled to a predetermined level with substance discharged from the supply line 46. Then a valve (not shown) in the supply line 46 is closed (whereby the pump 34 provided at the drain of the vessel 37 is likewise closed). A predetermined treatment program may be preselected by means of the program control device 65. The precise data of such a program depend somewhat on the kind of cocoa butter containing substance such as chocolate to be treated.

As soon as the program has been started manually or automatically a predetermined desired temperature of the tempering medium will be regulated by means of the temperature sensor 62 which responds to the temperature of the tempering medium. In the method of the invention the substance which has been filled into the vessel 37, must at first be gently cooled down to the intermediate temperature in the range from about 30° to about 31° C. by means of a tempering medium the temperature of which is only slightly lower than this intermediate temperature. Accordingly, in this first cooling stage the desired control temperature of the controller 64 responsive to the temperature sensor 62 may be adjusted to about 29.5° C. Then the heating and cooling device 51 will be controlled automatically by switching on the heater coils 52 or opening the control valves 55 for the cooling water so as to circulate the tempering medium at a temperature of about 29.5° C. through the heat exchangers 42 and 43 and the heating jacket 47 of the vessel 37. As soon as the substance which is continuously stirred by means of the agitator 38, 39, reaches the desired intermediate temperature at the end of the first stage which will be controlled by the sensor 61 and the controller 63 connected to this sensor the first cooling stage is terminated and the second cooling stage may be initiated. Therefore, as soon as the program control device 65 receives a signal from the sensor 61 responsive to the temperature of the substance indicating that the intermediate temperature has been reached the program control device 65 switches over to the second cooling stage in which the substance is cooled down to a predetermined second temperature preferably in the range from about 28° to about 29° C. The desired value of the temperature control of the tempering medium will be automatically reduced to a value somewhat below the desired temperature such as, for example, 27.5° C. so that the temperature of the tempering medium may be reduced to this value and kept constant at this value. After a certain time has expired the substance in container 37 has reached the desired second temperature of for example 28.5° C. and the controller 63 responsive to the sensor 61 switches the program control device further to the heating stage in which the substance is to be heated without overheating up to a predetermined third temperature which is preferably in the range from 33° to about 34° C. In this stage, the desired value of temperature control of the tempering medium is adjusted correspondingly, for example to 34.5° C. and the tempering medium circulating through the heat exchangers 42 and 43 and the heating jacket 47 of the vessel 37 is adjusted to this temperature. After a certain time the substance contained in the vessel 37 will have reached the desired third temperature of, for example, 33.5° C. This condition will again be indicated by the temperature sensor 61 and from this point onwards this temperature sensor 61 will take over the further temperature control of the tempering medium so that the temperature of the substance will be substantially maintained at the third temperature. The design and the construction of a regulating device or a program control unit for carrying out the above described steps is not difficult for one skilled in the art; therefore it appears unnecessary to described such a control device in detail. Such a type of control device naturally permits automatic control of other processes such as maintaining the substance for a predetermined time interval at an intermediate temperature or automatically switching on and switching off the pump 34 at the end of a complete treatment process and automatically discharging the contents of the vessel 37 into the storage reservoir 25. The renewed filling of the vessel 37 with untempered substance from the supply line 46 may also be effected automatically by the program control device 65.

With the above described apparatus, the temperatures of the tempering medium such as water are maintained substantially constant in every stage of the inventive method. These temperatures may be selected very close to the desired final temperature of the substance in each stage so that the cooling or the heating, respectively, in each stage may be effected very gently. The difference between the desired final temperature of the substance in a stage and the temperature of the tempering medium will of course be selected not too small in order to keep the time required for these treatment steps within reasonable limits.

The method of the invention may of course be also employed for continuous operation, for example by leading a stream of substance to be treated through three heat exchangers connected in series of which the first two heat exchangers effect the cooling in two stages and the third heat exchanger effects the heating of the substance to the third or final temperature.

The progress achieved by the present invention may be illustrated with a reference to some numerical data. When using a modern coating machine having a conveyor belt width of 800 mm. about 2,000 kg. of chocolate per hour are circulated through the coating box 1. Of this quantity of chocolate only about 150 kg. per hour are actually used up and about 1,850 kg. of chocolate per hour return through the outlets 3 to the circulation container 4. Whereas with conventional prior art coating machines the total circulating chocolate quantity (in the present example about 2,000 kg. per hour) or at least a substantial portion of this quantity had to be treated by the method of cyclic tempering or by the method of multicircuit-tempering, the method of the present invention requires to replace only the actual consumption (in the present example the 150 kg. per hour) by a supply of treated substance. Although, in principle, it was hitherto feasible to operate the coating machine for a certain time without partially or wholly retreating the circulating chocolate mass, deficiencies were incurred in as much as the gradual thickening of the substance could not be predicted accurately and could hardly be influenced. In many cases and for the sake of a prolonged continuous operation the coating machine was operated until the substance had thickened to a considerable degree; this of course results in a higher consumption of substance and thereby in higher costs, quite aside from the nonuniformity of the manufactured articles. In any case, all of the substance contained in the coating machine had to be retempered after a certain operation time and, additionally, in many cases it was even necessary to heat up the entire coating machine, in order to be able to remove the stiffly thickened substance from the machine.

A substance which has been treated according to the method of the invention is in a thermostable condition and may be stored indefinitely under stirring and when maintaining the temperature of the substance.

Further modifications are possible without departing from the scope of this invention.

I claim:

1. A method of treatment of cocoa butter containing molten chocolate mass for subsequent processing comprising the steps of heating the mass to a first temperature slightly above the highest melting point of the cocoa butter cooling the mass in two subsequent stages to a predetermined second temperature while being agitated comprising cooling the mass at the end of the first stage of a range approximately 30° to 31° C. by a cooling medium having a temperature only slightly lower than this range, and then cooling the mass in a second stage to said second temperature of approximately 28° to 29° C. by a cooling medium having a temperature only slightly lower than said last-mentioned range, and then heating the mass to a predetermined third temperature of approximately 33° to 34° C., said third temperature being lower than said first temperature.

2. A method as claimed in claim 1, characterized in that said cooling medium temperatures in said two stages are approximately 30° and 26° C., respectively.

3. A method as claimed in claim 1, characterized by the further step of discharging the reheated mass into a storage reservoir keeping it stored therein at said third temperature in tempered condition ready for processing.

4. A method as claimed in claim 1, characterized in that the temperature of said cooling medium in said first stage is higher than the final temperature of said mass in said second stage.

5. A method as claimed in claim 1 characterized in that said mass is kept at said temperature at the end of said first stage for a predetermined interval.

6. A method as claimed in claim 5, characterized in that said interval lasts at least 5 minutes.

7. A method as claimed in claim 1, wherein said processing is performed with an excess quantity of tempered mass at about said third temperature, characterized in that the residual quantity of said mass obtained after said processing is kept at said third temperature and recycled for continued processing without intermediate cooling down to said second temperature.

8. A method as claimed in claim 7, characterized by supplying said tempered mass to said processing at a rate corresponding to the quantity used as a result of said processing, said tempered mass being supplied at said third temperature.

9. A method as claimed in claim 8, characterized in that said tempered mass is supplied from a storage reservoir wherein said mass is accumulated after said tempering and kept stored therein at said third temperature in a tempered condition ready for said processing.

10. A method as claimed in claim 1, characterized in that at least one of said cooling stages is subdivided into further stages.

11. A method as claimed in claim 10, characterized in that the temperature of said cooling medium in a stage is higher than the final temperature of said mass in a subsequent stage.

* * * * *